Oct. 30, 1951           J. STEIN           2,572,888
HEATING AND VENTILATING SYSTEM
Filed June 15, 1944           2 SHEETS—SHEET 1
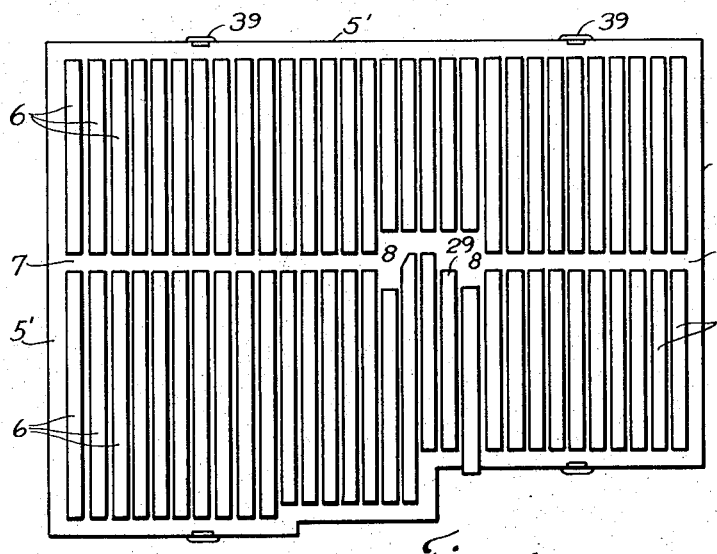
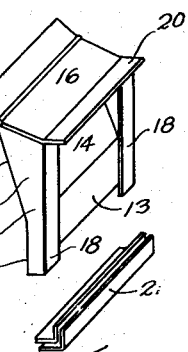
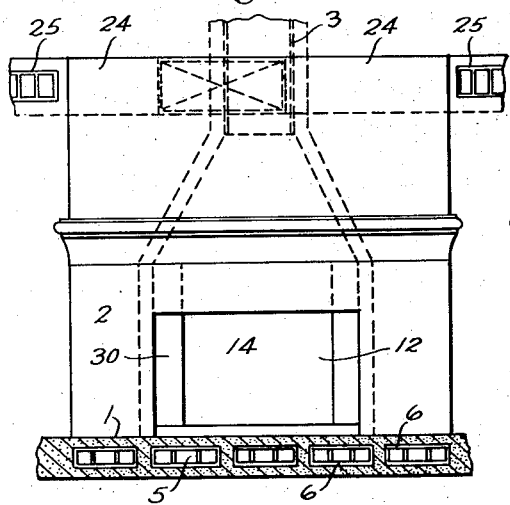
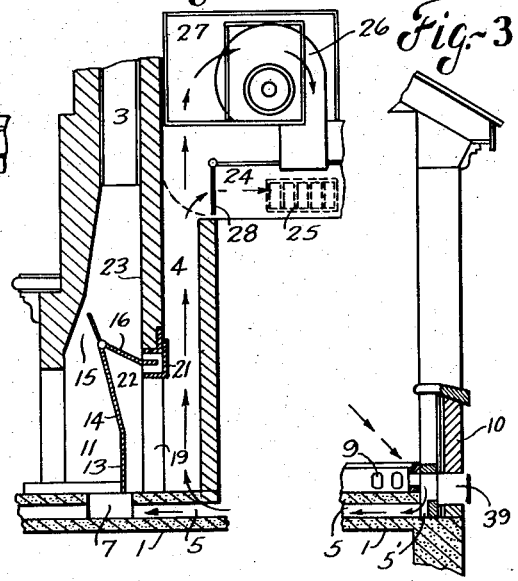
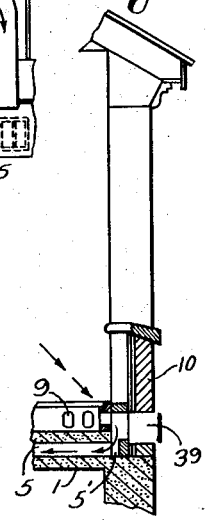
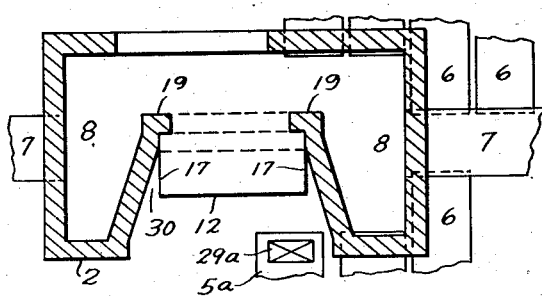
Inventor
Jack Stein
Tom Walker
Attorney Inventor
Jack Stein Tom Walker
Attorney

Patented Oct. 30, 1951

2,572,888

UNITED STATES PATENT OFFICE 2,572,888

HEATING AND VENTILATING SYSTEM

Jack Stein, Dayton, Ohio

Application June 15, 1944, Serial No. 540,458

5 Claims. (Cl. 237—51)

This invention pertains to air conditioning and ventilating, and more particularly to a hot air heating system and an alternative cooling system for buildings, and the mode of thermally conditioned air distribution therefor.

While the presently described heating system has been primarily designed for use in conjunction with a fireplace heating unit, it is to be understood that it is also usable with a conventional type of hot air furnace or other form of heating unit, or alternatively connected with a cooling unit for summer use.

The object of the invention is to improve the construction as well as the means and mode of operation of heat exchange air conditioning systems for buildings, whereby they may not only be economically installed and operated, but will be more efficient in use, automatic in operation, uniform in action, of simple construction, and unlikely to get out of order.

A further object of the invention is to assure uniform distribution and complete circulation of preconditioned air throughout a building, either warm or cooled air as the case may be, and equally uniform exhaustion of spent air from a stratum adjacent to the floor level throughout the building.

A further object is to provide means for warming the floors of a building by uniformly distributed circulation of warm air therethrough.

A further object of the invention is to provide an air circulating system which is readily convertible from a convection system to a forced draft system, and vice versa, and which may be alternatively utilized as either a heating or a cooling system.

A further object of the invention is to provide an air cooling and circulating system for buildings usable independently of or alternatively with the herein described heating and ventilating system.

A further object of the invention is to provide an air conditioning and ventilating system for buildings, having the advantageous structural features and inherent meritorius characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a front elevation of a residence fireplace with which the present heating system is associated.

Fig. 2 is a vertical sectional view of the structure shown in Fig. 1.

Fig. 3 is a vertical sectional view through an outside wall of the structure.

Fig. 4 is a horizontal sectional view through the floor of the house.

Fig. 5 is a detail plan view of the fireplace.

Fig. 6 is a perspective view of the fireplace radiator removed from its setting.

Fig. 7 is a detail perspective view of a double lintel for use with the fireplace radiator shown in Fig. 6.

Like parts are indicated by similar characters of reference throughout the several views.

Figure 8:
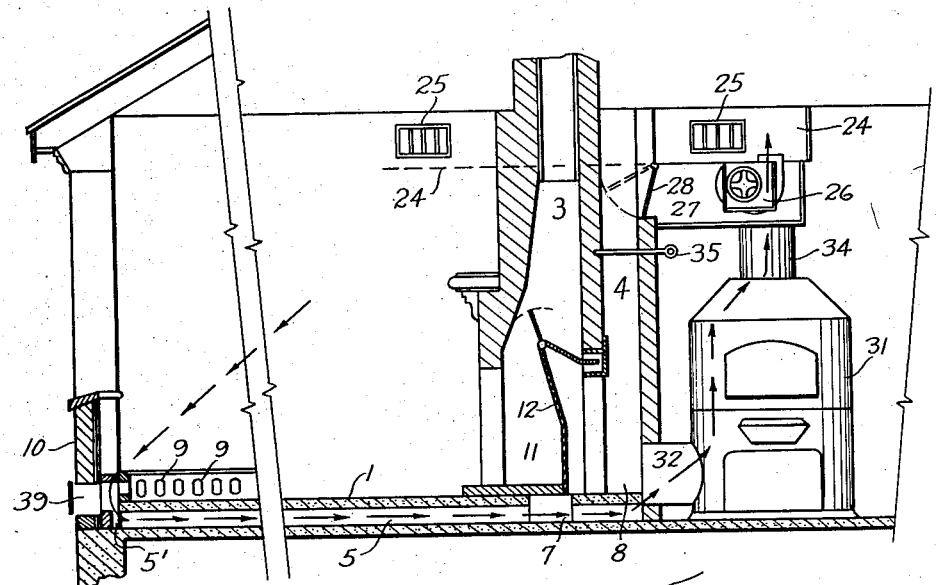
Fig. 8 is a sectional view of a building structure embodying the present heating and ventilating system, wherein a conventional hot air furnace is utilized as the thermal exchange or heating unit.

Briefly stated, the present heating and air distributing system includes the collection of partially cooled air from just above the floor level through outlet openings in the wall base substantially entirely about the room or rooms and conducting it through multiple conduits embedded in the floor to a heating unit. Remaining warmth of the air being circulated through the floor passages is transmitted to the floor. After passing in intimate relation with the heat unit, of whatever form, the air warmed thereby is conducted upwardly through a flue in close heat exchange relation with a chimney leading from the heater, whereby heat units resulting from combustion within the heater, which otherwise would be lost to atmosphere through the stack or chimney, are absorbed by the rising column of warm air in the closely adjacent warm air flue. Adjacent to the room ceiling the warm air is discharged from the flue into a warm air distributing duct, either by convection or by forced draft influence of a blower fan. From the warm air distributing duct the heated air is released through registers at elevated points in the room, from where it descends diagonally in various directions across the room to the wall base openings to again repeat its circulatory cycle.

Referring to the accompanying drawings, 1 is the floor of a building structure within which is located for heating purposes a fireplace 2, from which arises a chimney or smoke stack 3 leading to atmosphere. Immediately back of the fireplace 2 in heat exchange relation with the wall of the chimney 3, is a warm air flue 4, with which a plurality of air passages 5 formed in the floor 1 communicate. The multiple air passages 5 comprise parallel series of hollow building tiles disposed end to end and side by side to form separate parallel conduits. As illustrated, the hollow tile 6 are embedded in a concrete floor 1. However, the floor structure may be of other conventional construction in which the hollow tile conduits are embodied. The floor air passages 5 communicate at their inner ends with a common transverse air passage 7 extending in opposite directions beyond the fireplace 2. The passages 7 communicate at 8 with the lower end of the warm air flue 4. At their outer ends the floor air passages 4 communicate with the interior of the room through a plurality of relatively spaced air vents 9 located in the bases of the building walls 10 (Fig. 3). The air outlet vents 9 which are located slightly above the floor level in the bases of the room walls communicate with a common air passage 5' which surrounds the building. The floor passages 5 communicate with those portions of the circuitous passage or conduit 5' which extend transversely to the floor passages. Those portions of the common passage or conduit which extend parallel with the floor passages 5 communicate directly with the common passages 7. The lower portion of the warm air flue 4 is separated from the combustion chamber 11 of the fireplace by a heavy sheet metal or metallic plate radiator member 12, which forms the rear wall of the fireplace combustion chamber. This radiator 12, shown particularly in Fig. 6, comprises a relatively short vertical wall 13, from which extends a forwardly and upwardly inclined continuation 14, which approaches the forward wall of the chimney 3 above the opening of the fireplace to form a throat 15, from which a top wall 16 is inclined downwardly and rearwardly.

Side walls 17 extend rearwardly from the front walls 13 and 14, and terminate in inwardly turned flanges 18, abutting in parallel relation side ledges 19 of the rear chimney wall. At the rear margin of the inclined top wall 16 is a flange 20 which loosely engages in the slot of a double lintel 21 mounted in the rear wall of the chimney 3. The construction is such that while the radiator 12 is securely mounted to seal the warm air flue 4 from the fireplace combustion chamber 11 and the chimney 3 to prevent leakage of gas or products of combustion therefrom into the warm air flue, the radiator unit is not rigidly held, but is free for relative expansion and contraction. The radiator unit 12 affords back of the combustion chamber 11 of the fireplace a hot air chamber or pocket 22 communicating directly with the warm air flue 4. Cool air from the floor passages 5 and 5' entering the bottom of the warm air flue 4 through the common conduits 7 flows with considerable turbulence into and about the hot air chamber 22 before proceeding up the warm air flue 4. During such agitation the incoming air has wiping contact with the heated walls of the radiator 12 and absorbs heat therefrom. During the rise of the heated air up the flue 4, further heat is absorbed from the division wall 23 between the chimney 3 and warm air flue 4. At its top the warm air flue 4 communicates with a horizontally disposed warm air duct 24 positioned at substantially ceiling level. A series of relatively spaced registers 25 discharge the warm air from the distributing duct 24 into each of several rooms, or at spaced intervals into the same room. The discharged warm air flows diagonally in various directions across the rooms from the elevated registers 25 to the outlet vents 9 in the bases of the room walls and thence through the floor passages 5 and 5' and 7 to repeat its former cycle of circulation.

Ordinarily, if sufficient heat is being generated in the fireplace, the heated air will rise through the flue 4 and circulate through the rooms and through the floor passages by convection. However, when the fire is being started or when combustion is low, as well as in cold weather when more rapid circulation is required, forced draft circulation is induced. For such purpose a power blower fan 26 is mounted to discharge into the warm air distributing duct 24. The power fan 26 is enclosed within a chamber 27 which communicates with the warm air flue 4.

A swinging damper or diverter 28 common to the distributing duct 24 and the fan enclosure 27 serves to optionally connect the distributing duct 24 or the blower fan chamber 27 with the warm air flue. Thus, in one position of adjustment of the diverter 28, the warm air distributing duct 24 is directly connected with the warm air flue 4 for direct circulation of warm air by convection from the flue 4 through the duct 24 and into the room. When adjusted to its alternate position, the diverter 28 separates the flue 4 from direct communication with the distribution duct 24 and is connected with the fan chamber 27. Under such circumstance the warm air within the flue 4 is subject to suction influence of the blower fan, which influence also extends through the floor passages 5 and 5' to withdraw the spent air from the rooms. The warm air is thus discharged under forced draft from the flue 4 through the fan 26 unto the distributing duct 24 and thence into the rooms. Thus, the system is optionally convertible from a convection system of circulation to forced fraft circulation, and vice versa.

At least one of the floor passages 5a is extended to the exterior of the building where it communicates with atmosphere, and at its inner end it communicates through a floor register 29 with the combustion chamber 11 of the fireplace to supply oxygen to the fire.

While the invention has been described in association with a fireplace as the heating unit, for which the system is especially well adapted, it is not limited thereto, but may be utilized with a conventional type of hot air furnace located on the floor level or in a basement beneath the floor 1. In such event, the return cool air floor passages 7 should be connected with the cold air intake of the heater jacket of the conventional hot air furnace, and the flue 4 should be connected with the hot air outlet from the top of the furnace jacket. The system would otherwise function in conjunction with a conventional hot air furnace installation in the same manner as before described.

The radiator member 12 is preferably preconstructed and preferably is set in place for use as a form while the brick work of the fireplace and chimney 3 is constructed thereabout in close conformity with the rear flanges 18. Thus the angles of the radiator between the side walls and flanges thereof are made to closely conform to the extensions 19 of the chimney structure. The side walls of the combustion chamber 11 of the fireplace are preferably extended in divergent relation with the side walls of the radiator 12 to afford intervening pockets or spaces 30 for products of combustion, the heat from which is transmitted through the radiator side walls to the air supply within the hot air chamber or pocket 22 therein. The arrows of Figs. 2 and 3 indicate the circuitous course of the warm air under both convection and forced draft influence.

The presently described circulatory system may be used alternatively as an air conditioning or cooling system during the summer season. Without operation of the heater unit to warm the circulated air, the blower fan 26 may be utilized to withdraw air from the rooms, through the outlet vents 9 and through the floor passages, and thence through the flue 4 to the blower, by which it is returned to the rooms through the distributing conduit 24, thus affording forced ventilation and a rapid change of air which alone would have a decided cooling effect. However, for air conditioning purposes the return passages 7 preferably are connected with a chamber enclosing a cooling unit, an outlet of which is connected with the flue 4. The operation of the blower fan draws the supply of air from the rooms through the outlets 9 and floor passages 5' and 5 and thence through the cooling compartment mentioned back to the rooms. The system and its operation are quite the same as originally described. In both instances the circulated air is passed through a heat exchange zone. In the first instance heat is transferred to the circulating column of air, while in the last mentioned instance heat is transferred from the circulated air in such heat exchange zone. Whether used for heating or for cooling, the structure and mode of operation are quite analogous.

Figure 9:
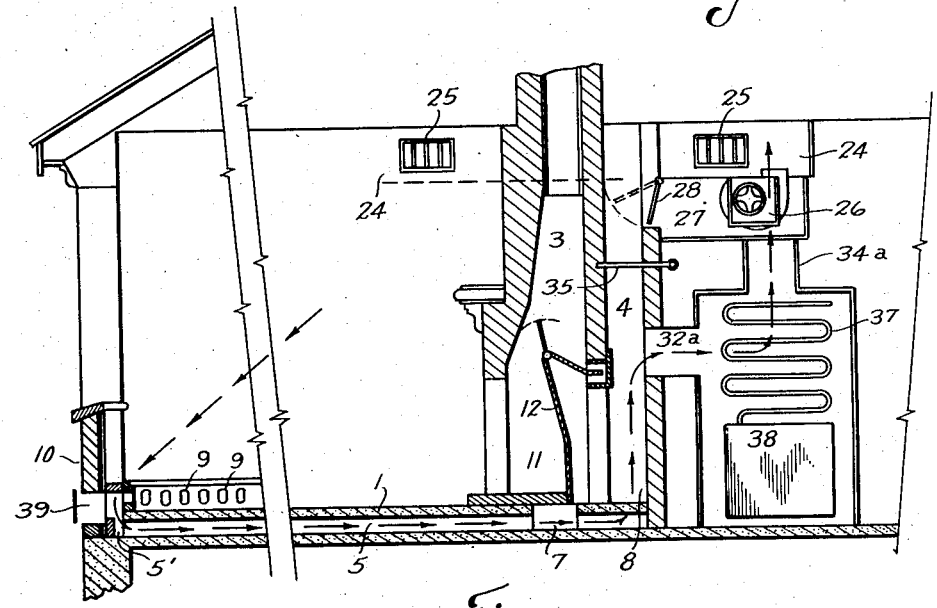
Fig. 9 is a similar view, illustrating the utilization of the instant circulatory system for cooling purposes by conducting the air through a cooler or chill compartment which serves as the heat exchange unit in lieu of the furnace or fireplace heater.

The above-mentioned variations of the instant disclosure are illustrated in Figs. 8 and 9.

In Fig. 8 there is shown a typical hot air furnace 31 which is shown located at floor level, for example in a utility room, but which, if desired, may be installed in a sub-level basement. The bottom of the surrounding jacketed air heating compartment of the furnace 31 is connected by a cold air intake conduit 32 to the common air return floor conduits 7. The smoke pipe 33 of the furnace is connected with the chimney 3. A hot air discharge conduit 34 connects the top of the air heating jacket of the furnace with the hot air duct 24 of the circulatory system. Such furnace heat generating system may be used either as a convection or gravity system, or the blower fan 26 may be used to induce forced draft circulation. The return air from the room flows through the wall outlets 9 and the floor passages 5 and 7, and thence through the conduit 32 to the heating jacket forming part of the furnace 31. After passing through the heating jacket of the furnace the heated air is discharged through the conduit 34 leading therefrom into the warm air duct 24. The warm air rises through the conduit 34 either by convection or under influence of the blower fan as before described, and is discharged into the room through the warm air duct 24 and register 25 for recirculation through the same course.

For summer use a cooler unit 36, having therein the usual expansion coils 37 through which a refrigerant is circulated by a compressor unit in the compartment 38, is substituted for the hot air furnace 31, as illustrated in Fig. 9. The cooler compartment 35 communicates with the air return floor passages 5 and 7 through the receiving conduit 32a. After passing through the unit 36, wherein the heat is extracted, the cooled air is delivered through the discharge conduit 34a to the air duct 24. In this instance the blower fan 26 is utilized to create forced draft circulation from the room being cooled, through the floor passages 5 and 7 and through the cooler unit 36, and thence drawn upwardly into the distribution duct 24. From the duct 24 the cooled air is distributed back to the room through the duct 24 and register 25 for recirculation. A damper 35 serves to close the flue 4 to prevent short circuiting of the air current directly to the flue and blower fan, without passing through the furnace 31 or the cooler unit 36.

The heat exchange system forming the subject matter hereof may be installed for heating purpose or for cooling purpose only, in lieu of optional alternative use before mentioned.

To enable entry of fresh air into the system from outside the building, a series of ventilators 39 are provided which interconnect the common air passage 5' with atmosphere. One or more of these ventilators may be opened or closed as needed, in accordance with variations of atmospheric or temperature condition.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A heating system for a house having side walls, floors, a fireplace and a chimney flue leading from the fireplace, including a back wall in the fireplace dividing the latter into a combustion chamber and a hot air compartment, a heated air flue leading from the hot air compartment, a warm air distribution duct, a blower chamber, a blower therein discharging into the warm air duct, an adjustable damper for optionally connecting the hot air flue with the warm air duct or with the blower chamber and blower and thence with the warm air duct, a multiplicity of air passages embedded in the floor of the house, air inlet openings in the bases of the walls, a floor duct common to the inlet openings and floor passages, a second floor duct common to the multiplicity of air passages connecting said passages with the hot air compartment for circulation of room air drawn through the base openings and floor passages to the hot air compartment, and thence through the heated air flue to the warm air distribution conduit optionally by convection or by forced draft of the blower for discharge into the rooms for recirculation of the heated air through the floor passages, by which the house floors will be warmed, an independent floor passage, an inlet opening therefor communicating directly with outside atmosphere and an outlet opening therefor communicating with the fireplace combustion chamber to supply ample oxygen thereto.

2. A heating system for a house having side walls, floors and a fireplace communicating with a chimney flue leading upwardly therefrom, including a metal back in the fireplace dividing the latter into a combustion chamber and a hot air compartment, a heated air flue leading upwardly from the heated air compartment, a warm air distribution duct adjacent the top of the room discharging into one or more rooms, a blower chamber, a blower therein discharging into the warm air duct, a damper adapted by its adjustment into alternate positions to optionally connect the heated air flue with the warm air distributing duct, either directly or through the blower chamber and blower, multiple air passages in the floor of the house communicating with the said hot air compartment, air intake openings in the bases of the walls communicating with the floor passages, through which air is withdrawn from the room to the hot air compartment and heated air flue for return to the room in continuous cycle.

3. A heating system for a house having side walls, floors, a fireplace and a chimney flue leading from the fireplace, including a hot air compartment in closely associated relation with the fireplace combustion chamber wherein the air is heated thereby, a heated air flue leading therefrom and discharging into a room of the house, a series of closely adjacent air passages embedded in the floor and communicating with the hot air compartment, a supply passage embedded in the floor and communicating with the air passages, air ports in the walls communicating with the supply passage, additional air ports connecting the supply passage with outside atmosphere, an additional floor passage directly interconnecting the fireplace combustion chamber with outside atmosphere, the construction and arrangement being such that a continuous circulation of preheated air from the room intermixed with outside air is established through the floor passages to the hot air compartment and back to the room, by which the floor is warmed by the passage of preheated air through the floor passages simultaneously with the supplying of sufficient air to the combustion chamber to support efficient combustion therein.

4. A house heating system, including a fireplace, a heat conductive unit dividing the fireplace into a combustion compartment and a hot air compartment, a chimney for the discharge of combustion gases from said combustion compartment, a discharge duct leading from said hot air compartment to the interior of the house, a vertical wall in said fireplace in part defining said chimney and said duct, a mounting for said heat conductive unit in said vertical wall providing for expansion and contraction of said unit, and ducting to supply said hot air compartment with recirculated air from the interior of the house.

5. A house heating system according to claim 4, characterized in that said ducting opens into said hot air compartment adjacent to said heat conductive element for a flow of air in contacting parallel relationship thereto productive of maximum thermal effect.

JACK STEIN.

REFERENCES CITED

The following references are of record in the file of this patent:

UNITED STATES PATENTS

| Number | Name | Date |
|---|---|---|
| 219,530 | Sage | Sept. 9, 1897 |
| 426,552 | Smead | Apr. 29, 1890 |
| 445,486 | Andrews | Jan. 27, 1891 |
| 514,309 | Decker | Feb. 6, 1894 |
| 1,430,781 | Ackroyd | Oct. 3, 1922 |
| 1,520,231 | Fleisher | Dec. 23, 1924 |
| 1,546,450 | Meaker | July 21, 1925 |
| 1,788,067 | Scanlan | Jan. 6, 1931 |
| 1,868,745 | Greimann | July 26, 1932 |
| 1,887,938 | Lewis | Nov. 15, 1932 |
| 2,158,041 | Covert | May 9, 1939 |
| 2,182,686 | Young | Dec. 5, 1939 |
| 2,184,113 | Calafati | Dec. 19, 1939 |
| 2,195,691 | Burt | Apr. 2, 1940 |
| 2,206,119 | Persons | July 2, 1940 |
| 2,225,244 | Anderson | Dec. 17, 1940 |
| 2,237,831 | Jones | Apr. 8, 1941 |
| 2,274,341 | Mueller | Feb. 24, 1942 |
| 2,277,381 | Black | Mar. 24, 1942 |
| 2,306,034 | Bernhardt | Dec. 22, 1942 |
| 2,322,016 | Hardeman | June 15, 1943 |

FOREIGN PATENTS

| Number | Country | Date |
|---|---|---|
| 32,761 | Switzerland | Dec. 26, 1904 |
| 467,067 | Germany | Oct. 17, 1929 |
| 602,489 | France | Dec. 28, 1925 |

OTHER REFERENCES

An article by Richard Brindley et al. in "Heating and Ventilating," July 1941.